United States Patent [19]

Andrus

[11] Patent Number: 5,465,669
[45] Date of Patent: Nov. 14, 1995

[54] INTERMODAL RAIL DRAG REDUCER WITH FLEXIBLE ENCLOSURE BETWEEN CWS

[76] Inventor: Paul G. L. Andrus, 650 Dunbar Road, Kitchener, Ontario, Canada, N2M 2X4

[21] Appl. No.: 351,031

[22] Filed: Nov. 29, 1994

[51] Int. Cl.⁶ .................................................. B61D 17/02
[52] U.S. Cl. ........................................ 105/1.1; 296/180.1
[58] Field of Search ................................ 105/1.1, 1.2, 1.3, 105/3, 4.1; 280/400; 296/180.1, 180.2, 180.4

[56] References Cited

U.S. PATENT DOCUMENTS

| | | | |
|---|---|---|---|
| 2,101,793 | 12/1937 | Field, Jr. ............................. | 105/1.3 |
| 3,945,677 | 3/1976 | Servais et al. ...................... | 105/1.1 |
| 4,343,505 | 8/1982 | Levassor ............................. | 296/180.2 |
| 4,702,509 | 10/1987 | Elliot, Sr. ........................... | 296/180.4 |
| 4,756,256 | 7/1988 | Rains et al. ......................... | 105/1.1 |

FOREIGN PATENT DOCUMENTS 4059469  2/1992  Japan ........................................ 105/1.1

*Primary Examiner*—Robert J. Oberleitner
*Assistant Examiner*—S. Joseph Morano

[57] ABSTRACT

A flexible sheet is erected on four rigid poles to form three rectangular sides thus containing the empty space between intermodal freight containers on consecutive flat-bed rail cars thereby reducing the aerodynamic drag which results from the sizeable gap between containers which is not present between traditional box cars. The apparatus can be raised and lowered by a rope and pulley mechanism, and can be separated into halves to allow detachment of consecutive rail cars.

2 Claims, 2 Drawing Sheets

INTERMODAL RAIL DRAG REDUCER WITH FLEXIBLE ENCLOSURE BETWEEN CWS

BACKGROUND OF THE INVENTION

Traditionally railway box-cars are spaced closely together such that the aerodynamic drag of the gap between them is relatively minor even at top speed. However with the in,teased use of standard intermodal (i.e., ship-rail-truck) freight containers, the length of which is less than that of standard flat-bed rail cars, the gap between consecutive containers on rail cars is significant as a fraction of container width. As the gap between consecutive rectangular containers rises from zero to even as little as half the container width, the drag coefficient of the container rises markedly. Aerodynamic drag consumes a significant fraction of the energy required to move a train of intermodal containers, especially considering the relatively low rolling resistance of rail cars.

DETAILED DESCRIPTION OF THE PREFERRED EMBODIMENT

Figure 1:
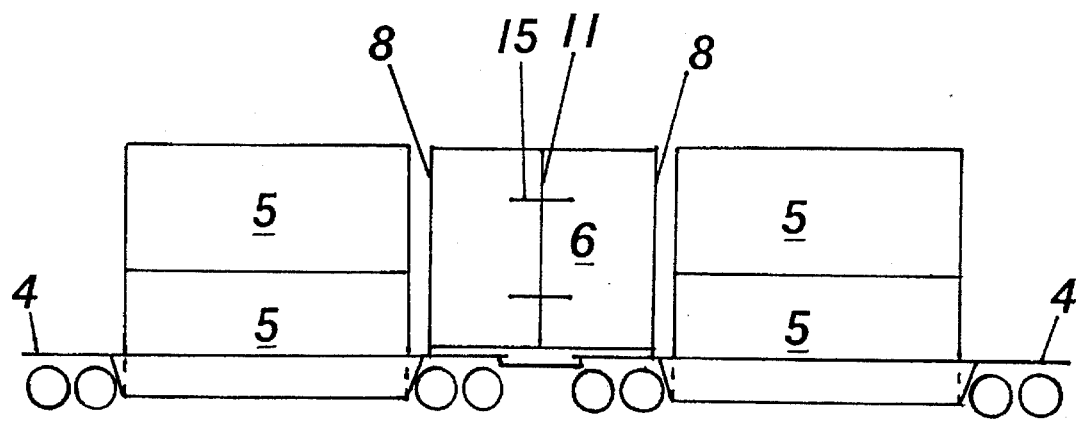
FIG. 1 is a side view of two consecutive rail cars carrying double-stacked freight containers with the invention deployed between them.
Figure 2:
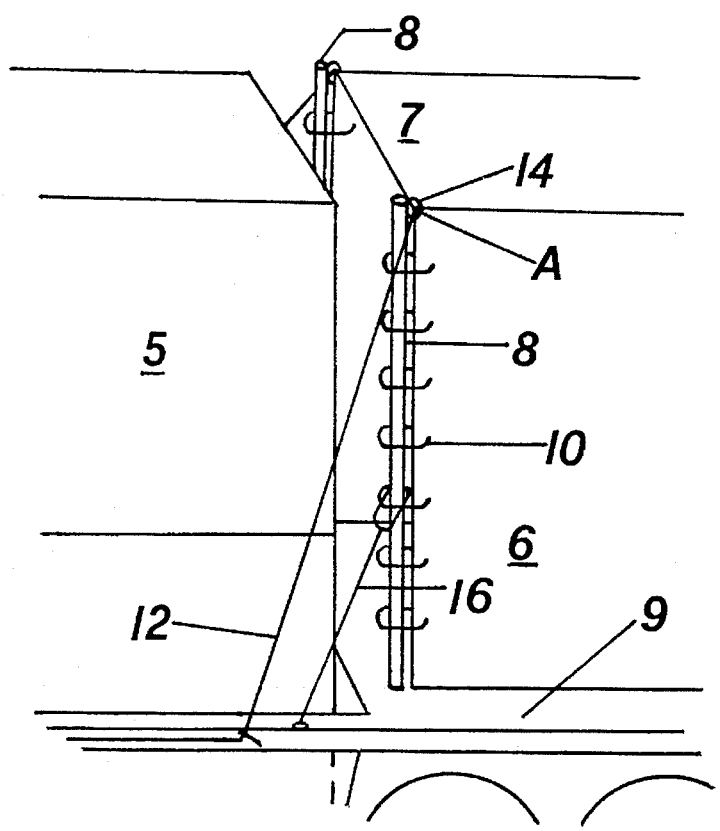
FIG. 2 is a perspective view showing the invention mounting apparatus.
Figure 3:
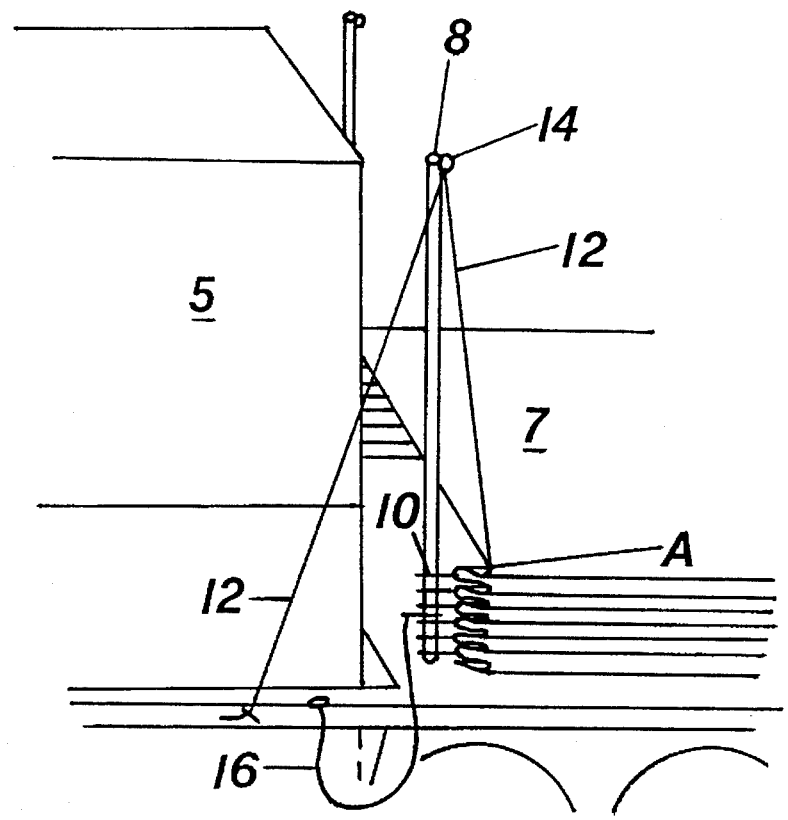
FIG. 3 shows the apparatus lowered in an undeployed state.

FIG. 1 shows two consecutive flat-bed rail cars 4, each carrying two intermodal freight containers 5. The invention is comprised of a sheet of flexible material such as canvas forming two lateral side panels 6 and one horizontal top panel 7 thus substantially enclosing the air-space between the containers 5 of consecutive rail cars 4. The canvas sheet is suspended by four mounting poles 8 which are fixed to the rail car's floor 9 and each mounting pole 8 is supported by a wire 16 as shown in FIG. 2. A rope 12 is strung through a ring or pulley means 14 on the top end of each mounting pole 8, and attached to the canvas sheet at the corner where the side panel 6 meets the top panel 7 at point A, the other end of the rope 12 being fixed to the rail car floor 9. When the four ropes 12 are released, the side panels 6 fold upon themselves at their bottom edges. Thus, the top panel 7 can be adjusted to accomodate a double-stacked or single container height, or be dropped completely to the rail car floor 9 as shown in FIG. 3.

Figure 4:
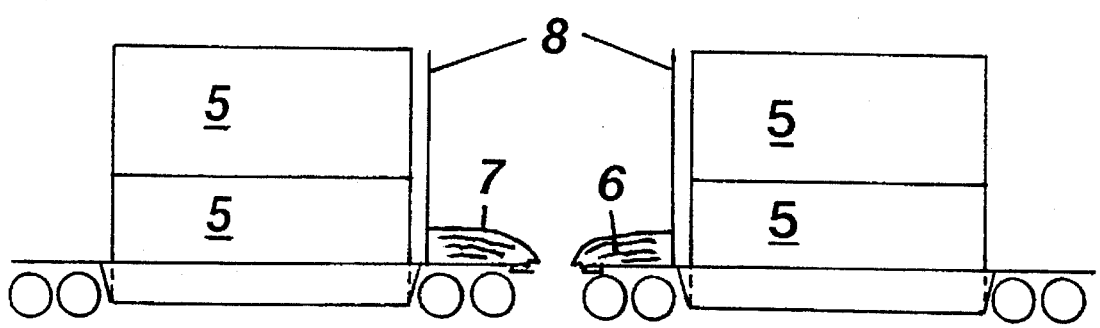
FIG. 4 shows the apparatus lowered and separated to allow detachment of consecutive rail cars.

The side panels 6 and top panel 7 are discontinuous along a small gap 11 between the rail cars 4. The gap 11 is bridged by elastic cords 15 which keep the flexible panels 6 and 7 taut while allowing stretch around railway curves. When the apparatus is lowered as in FIG. 3. it can be separated along the gap 11 by reaching the elastic cords 15 from one half of the side panels 6 and top panel 7 allowing the consecutive rail cars 4 to go their separate ways as in FIG. 4.

It is also within the scope of the invention that it be used with transport truck trailers riding on flat bed rail cars with the wheels still attached as these trailers effectively represent intermodal freight containers in this setting. Other means of "housing" the bulk of the air-space between consecutive containers are also within the scope of the present invention.

Alternatively, the poles 8 may be flexible and fixed only at their lower ends to the rail car floor 9 without use of wires 15, as the ropes 12 would stabilize the upper ends of the poles 5.

In the event of severe cross-winds, toe elastic cords 15 are sufficiently long and arranged such that the gaps 11 would be forced open more widely allowing the air to rush through and not catch the wind and thereby potentially destabilize the apparatus.

I claim:

1. A container carrying vehicle drag reducing system comprising:

at least two vehicles, each vehicle having at least one container disposed thereon, each said container having a top surface and first and second side surfaces;

enclosing means for substantially enclosing the air-space between adjacent ones of said at least two vehicles, said enclosing means comprising:

a sheet of flexible material having a top face substantially planar with the top surface of said at least one container on each of said adjacent ones of said vehicles, and first and second side faces, said first side face being substantially planar with said first side surface and said second side face being substantially planar with said second side surface, of said at least one container on each of said adjacent ones of said vehicles, and mounting means for mounting said enclosing means to said adjacent ones of said at least two vehicles, said mounting means comprising rigid mounting poles connected at one end to said adjacent ones of said at least two vehicles, and a rope and pulley mechanism connected at the other end of said mounting poles for suspending said top face from said mounting poles, said rope and pulley mechanism enabling said top face to be raised and lowered along said poles.

2. A container carrying vehicle drag reducing system according to claim 1, wherein said sheet comprises two adjacent halves with a gap therebetween, and said enclosure means further comprises detachable elastic cords spanning said gap so as to detachably connect said two adjacent halves together, thereby allowing independent movement of said adjacent ones of said at least two vehicles when said cords are removed.

* * * * *